United States Patent [19]
Jones, Jr.

[11] Patent Number: 5,673,206
[45] Date of Patent: Sep. 30, 1997

[54] REAL-TIME DIGITAL AUDIO COMPRESSION/DECOMPRESSION SYSTEM

[75] Inventor: Ronald Henry Jones, Jr., Delray Beach, Fla.

[73] Assignee: International Business Machines Corporation, Armonk, N.Y.

[21] Appl. No.: 670,483

[22] Filed: Jun. 26, 1996

Related U.S. Application Data

[62] Division of Ser. No. 174,800, Dec. 29, 1993, Pat. No. 5,561,688.

[51] Int. Cl.$^6$ .................................................. G06F 17/00
[52] U.S. Cl. ............................................................. 364/514 R
[58] Field of Search .................. 364/514 R, 715.02; 381/29, 30; 382/244, 236; 345/202; 348/409; 395/114, 115

[56] References Cited

U.S. PATENT DOCUMENTS

| | | | |
|---|---|---|---|
| 4,068,224 | 1/1978 | Bechtle et al. | 345/202 |
| 5,432,891 | 7/1995 | Onodera | 395/115 |
| 5,490,221 | 2/1996 | Ransford et al. | 382/215 |

*Primary Examiner*—Ellis B. Ramirez
*Attorney, Agent, or Firm*—Jeffrey S. LaBaw

[57] ABSTRACT

Digitized audio information is compressed by retrieving a first audio sample from a digitized audio signal and storing it in its entire, uncompressed, form. The next audio sample is then retrieved and a signed difference between the first audio sample value and the next audio sample value is computed. If this difference value can be represented in fewer data segments than would be required to represent the next audio sample, the difference value is stored, rather than the value of the next sample, otherwise the next sample is stored. The invention proceeds in this fashion until the entire PCM audio signal is compressed and stored. The compressed data stream is decompressed to generate an output data stream by retrieving a stored sample and examining it to ascertain whether it is a difference value or a flag which indicates that the following data represents a coded amplitude value. If the sample is a difference value it is digitally added to the previous value (taking into account the sign) and the sum is inserted into the output data stream. The sum value is retained in order to be used to compute the next output value if the following sample is also a difference value. Alternatively, if the sample is a flag value it is discarded and the next sample is retrieved and inserted into the output data stream.

13 Claims, 7 Drawing Sheets

5,673,206

REAL-TIME DIGITAL AUDIO COMPRESSION/DECOMPRESSION SYSTEM

This application is a Divisional of U.S. application Ser. No. 08/174,800, filed Dec. 29, 1993, which is now U.S. Pat. No. 5,561,688.

FIELD OF THE INVENTION

This invention relates generally to digitized audio signals and more specifically to computer systems which compress and decompress pulse code modulated (PCM) audio signals.

BACKGROUND OF THE INVENTION

The past decade has seen a revolution in computing. The advent and proliferation of personal computers has transformed the computing environment from one which was highly centralized and tightly controlled to one which is widely distributed with easy access. A significant expansion of computing applications is a concomitant result of this changing computer environment. In the past, computers provided, primarily, accounting, data reduction, and database management functions. They now, additionally, provide voice messaging, games, and multimedia applications, such as business presentations. While the older applications could be accommodated using only text-type data, the newer applications require graphical and audio data as well.

Graphical and, more to the point of this invention, audio signals require significant capacity for storage. For example, the word "hand" would require 4 bytes, 1 byte for each letter, for storage as text. On the other hand, the storage required for a digital audio version of "hand", assuming pulse code modulation (PCM) with 16 bits per sample with 20,000 samples per second, and assuming 1 second is required to utter "hand", is about 40,000 bytes. Although the cost-per-bit of computer storage has fallen dramatically, limited storage still imposes severe constraints on computer applications which use digitized audio. Consequently, it is highly desirable to compress digitized audio signals for use in multimedia computer environments.

Audio signals are commonly digitized using pulse code modulation (PCM) techniques. Pulse code modulation is applied by sampling an analog audio signal at a fixed rate, for example, 20 kHz, to produce a stream of pulse samples. The modulation technique then assigns a digital value to each sample which is representative of its amplitude.

Attempts have been made to compress PCM audio, but these attempts have generally required the addition of specialized compression/decompression equipment to existing computer equipment. The equipment typically receives PCM audio signals from an audio system, compresses the signals, and passes the compressed signals, as data, to a computer, which in turn stores the data. In order to regenerate the signals any system which retrieves the compressed data must also possess the specialized compression/decompression equipment.

The additional specialized compression/decompression equipment increases the cost and complexity of any system which employs it. Additionally, because the compression/decompression equipment generally compresses the PCM audio signal in a unique way, only other systems with compatible specialized equipment can utilize the compressed signals.

Some compression/decompression systems do not require specialized compression/decompression equipment. However, these systems do not provide real-time, lossless compression and decompression of high-quality PCM audio. They may require that PCM signals be stored and compressed off-line; a one-second audio signal would require more than one second to process. They may also provide lossy compression in order to obtain real-time operation. Lossy compression simply means that some of the signal's data is discarded in order to reduce the number of digits required to represent each sample.

It is therefore an object of the invention to compress and decompress digitized audio signals for computer system storage in a way that eliminates the need for specialized compression/decompression equipment.

It is a further object of the invention to compress and decompress digitized audio signals for computer systems with sufficient efficiency to permit real-time, lossless compression and decompression of high-quality digitized audio signals.

SUMMARY OF THE INVENTION

In accordance with one embodiment of the invention, digitized audio information is compressed by retrieving a first audio sample from a digitized audio signal and storing it in its entire, uncompressed, form. The next audio sample is then retrieved and a signed difference between the first audio sample value and the next audio sample value is computed. If this difference value can be represented in fewer data segments than would be required to represent the next audio sample, the difference value is stored, rather than the value of the next sample, otherwise the next sample is stored. The next audio sample is then retrieved, the signed difference value between this and the prior sample computed, and the difference value or the sample value is stored if it occupies less storage space, otherwise the sample value is stored along with a unique, flag, or key value which indicates that the sample is stored in an uncompressed form. The invention proceeds in this fashion until the entire PCM audio signal is compressed and stored.

Because sequential audio samples are likely to be relatively similar in amplitude, the difference in amplitude from one sample to another is likely to consume significantly less storage space than the digitally-coded amplitude of the subsequent sample. Therefore, a high proportion of the compressed data will be stored as difference values. However, there will generally always be some samples stored as coded amplitudes. This occurs because digital data is stored and retrieved in fixed-size units and thus the coded amplitude of a sample may be stored even if the amplitude difference between two sequential samples is less than the coded amplitude. For example, audio signals are commonly digitized in 16-bit samples, but digital values are commonly stored in eight-bit bytes. Consequently, if the difference between two sample amplitudes is greater than can be represented in one byte, the amplitude value of the subsequent sample will be gored because the difference value will not occupy less storage space. A flag will also be stored to indicate that the value stored is an uncompressed sample. Alternatively, if the amplitude difference can be represented in one byte, then it will occupy less storage space than the coded amplitude value and the value stored for the sample will occupy one byte.

Consequently, when a sample amplitude is stored as a coded amplitude rather than a difference value, a "flag" is inserted into the compressed data stream which specifies that the following value is an amplitude value rather than a difference value. For example, in the case where two bytes are used to code an amplitude value, the flag specifies that the following two bytes represent a coded amplitude value (a flag is not utilized for the first sample however).

In accordance with another embodiment of the invention, the compressed data stream is decompressed to generate an output data stream by retrieving the first stored sample from, for example, a storage device. The first sample is always a coded amplitude sample and is directly inserted into the output data stream. The next sample is retrieved and examined to ascertain whether it is a difference value or a flag which indicates that the following data represents a coded amplitude value. If the sample is a difference value it is digitally added to the previous value (taking into account the sign) and the sum is inserted into the output data stream. The sum value is retained in order to be used to compute the next output value if the following sample is also a difference value. Alternatively, if the sample is a flag value it is discarded and the next sample is retrieved and inserted into the output data stream. Operation continues in this way until all of the stored compressed data has been decompressed.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
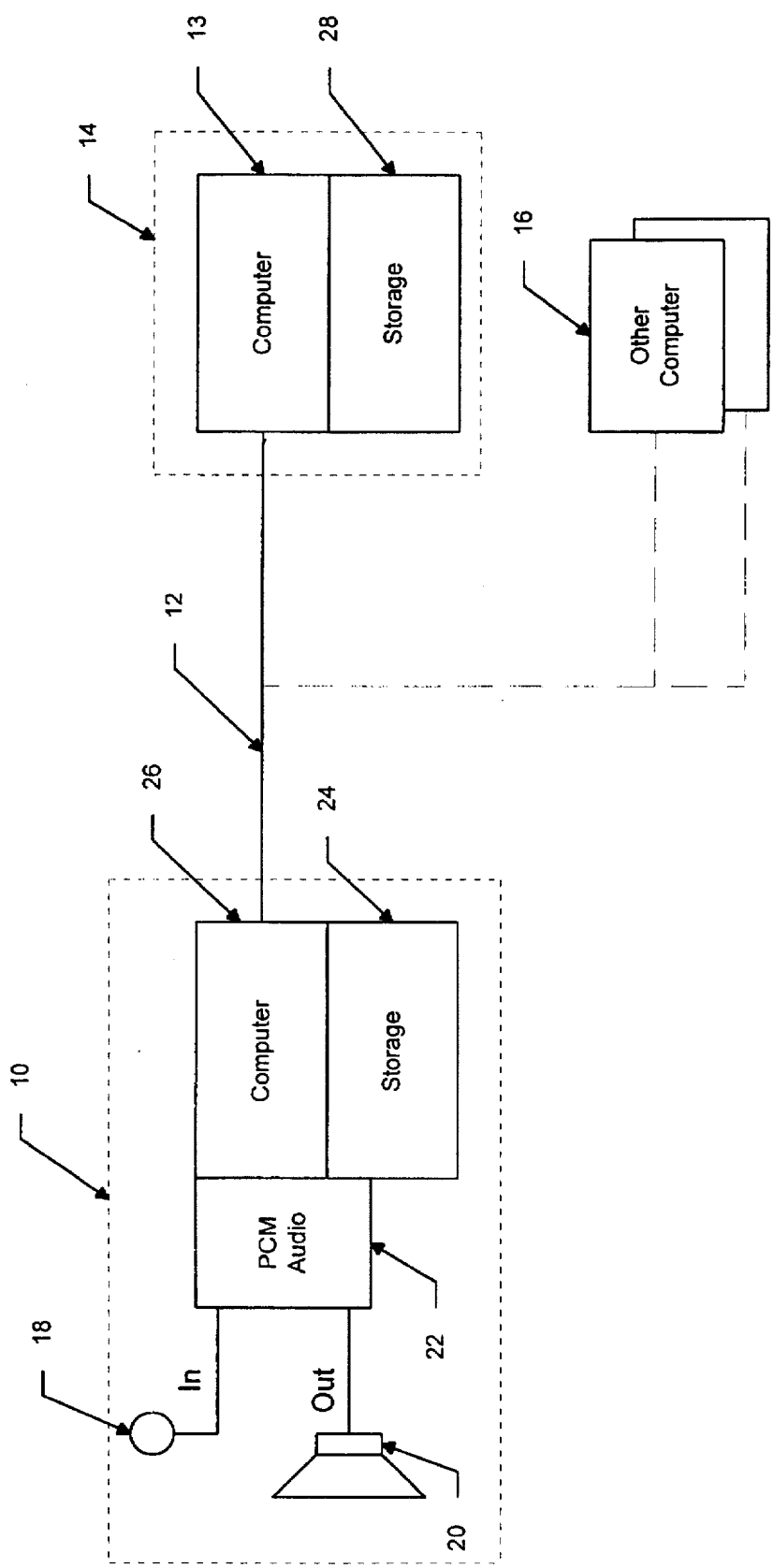
FIG. 1 is an illustrative networked multimedia computer system which employs the invention.

Referring to FIG. 1, a multimedia computer system 10 communicates over a network 12 with a computer system 14 and additional other computers 16. The precise characteristics of the network 12 are not important for the operation of the present invention. For example, the network 12 may be implemented by any one of a variety of physical media, may exhibit any of a variety of topologies such as star or ring topologies and may be a local area network or wide area network. Computer systems 10, 14 and 16 transfer information between themselves through the network 12 in the form of digital data which may represent textual information, graphical information, or digitized audio information.

The illustrative multimedia computer system 10 includes a conventional audio input device 18 (such as a microphone), a conventional audio output device 20 (such as a speaker), and known PCM audio coding equipment 22. Equipment 22 may be a stand-alone unit or a plug-in card with direct communication to an internal bus of computer 26. A storage device 24 is also associated with computer system 10 and may be an integral part of computer 26 or it may be a stand-alone storage system.

Similarly, the storage device 28 may be an integral part of the computer 13 or a stand-alone device. Although not illustrated, computer system 14 may also have PCM audio coding equipment and audio input and output devices such as devices 18, 20 and 22 illustrated in conjunction with computer system 10. Alternatively, the computer system 14 may act as a server, for example, to store and retrieve data on the storage device 28 which may have sufficient capacity to provide storage for a number of computers attached to the network 12.

In operation, the conventional PCM audio coding equipment 22 accepts an analog audio signal from the input device 18. The analog audio signal is sampled at a fixed rate, for example, 20 kHz, to produce a stream of samples with varying analog amplitudes. The amplitude of each pulse is then quantized and the quantized value is coded into a binary code. The resulting PCM binary data stream is sent through computer 26 to storage device 24. Alternatively, the computer 10 may send the digital data over the computer network 12 to computer 14 for remote storage in storage unit 28 or to other computers 16 for additional processing.

The invention's compression method may be performed by software running on computer 26 or may be performed by dedicated hardware located in computer system 26. In either case, the PCM digital signal received from the PCM audio equipment 22 is received by computer system 26 and compressed prior to storage in the storage device 24 or transmission over network 12. Conversely, the invention decompression method operates in conjunction with the computer 26 to retrieve and decompress audio data stored in the storage device 24 or transmitted over network 12 from storage 28 to produce a PCM digital data stream. The computer 26 transfers this PCM digital data stream to the PCM audio equipment 22 which converts the digital stream into an analog audio signal which is then transmitted to output device 20. Note that, in contrast other PCM data reduction systems, the invention produces PCM digital audio data for presentation to the PCM audio equipment 22 or to the network 12 (of course, the invention may present compressed samples to the network). As a result, no specialized digital audio equipment is required for use with the multimedia computer audio system 10 or with the other computer systems 14 or 16.

Figure 2A:
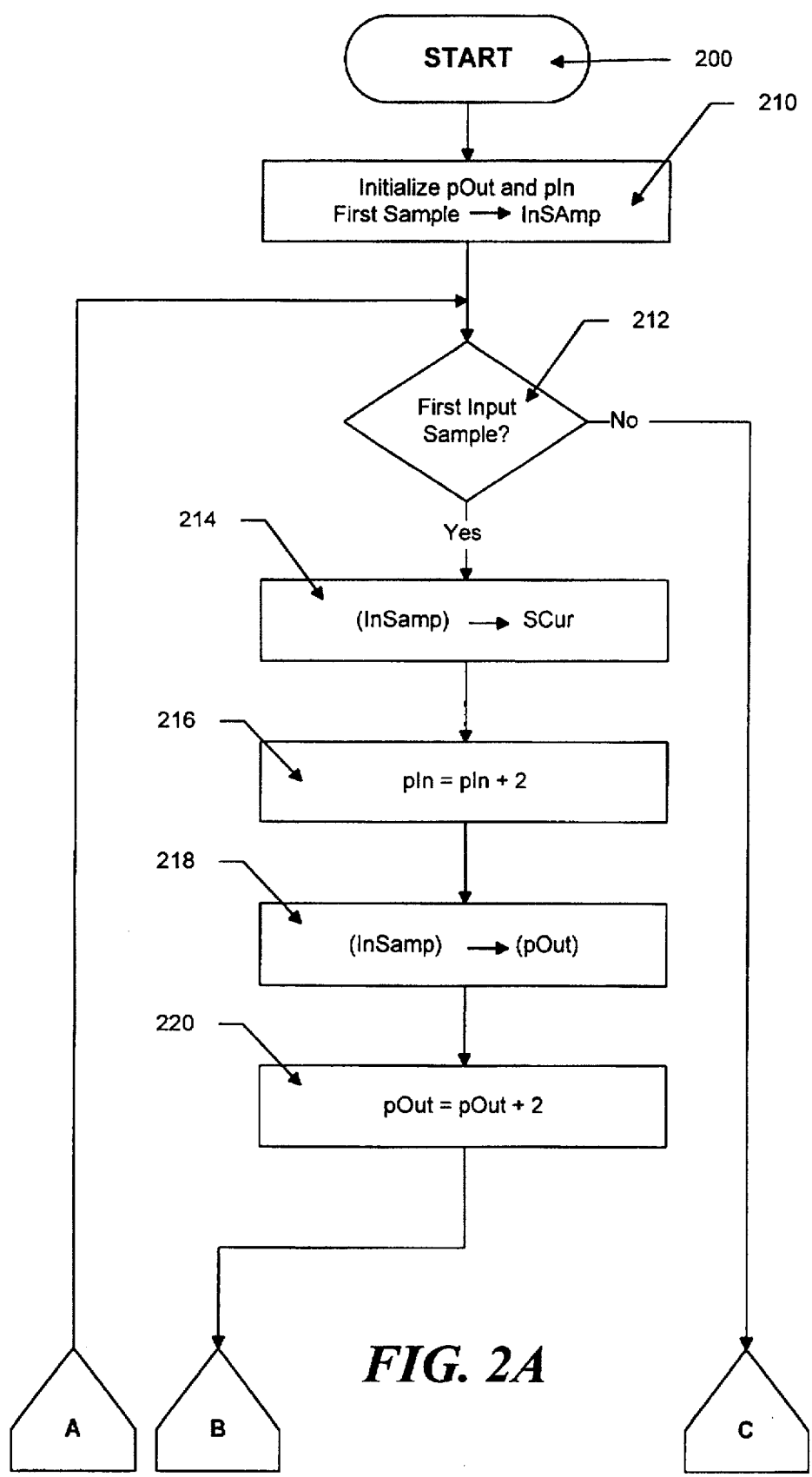
FIGS. 2A–2C, when placed together, form a flow diagram which illustrates the inventive digitized audio compression method.
Figure 2B:
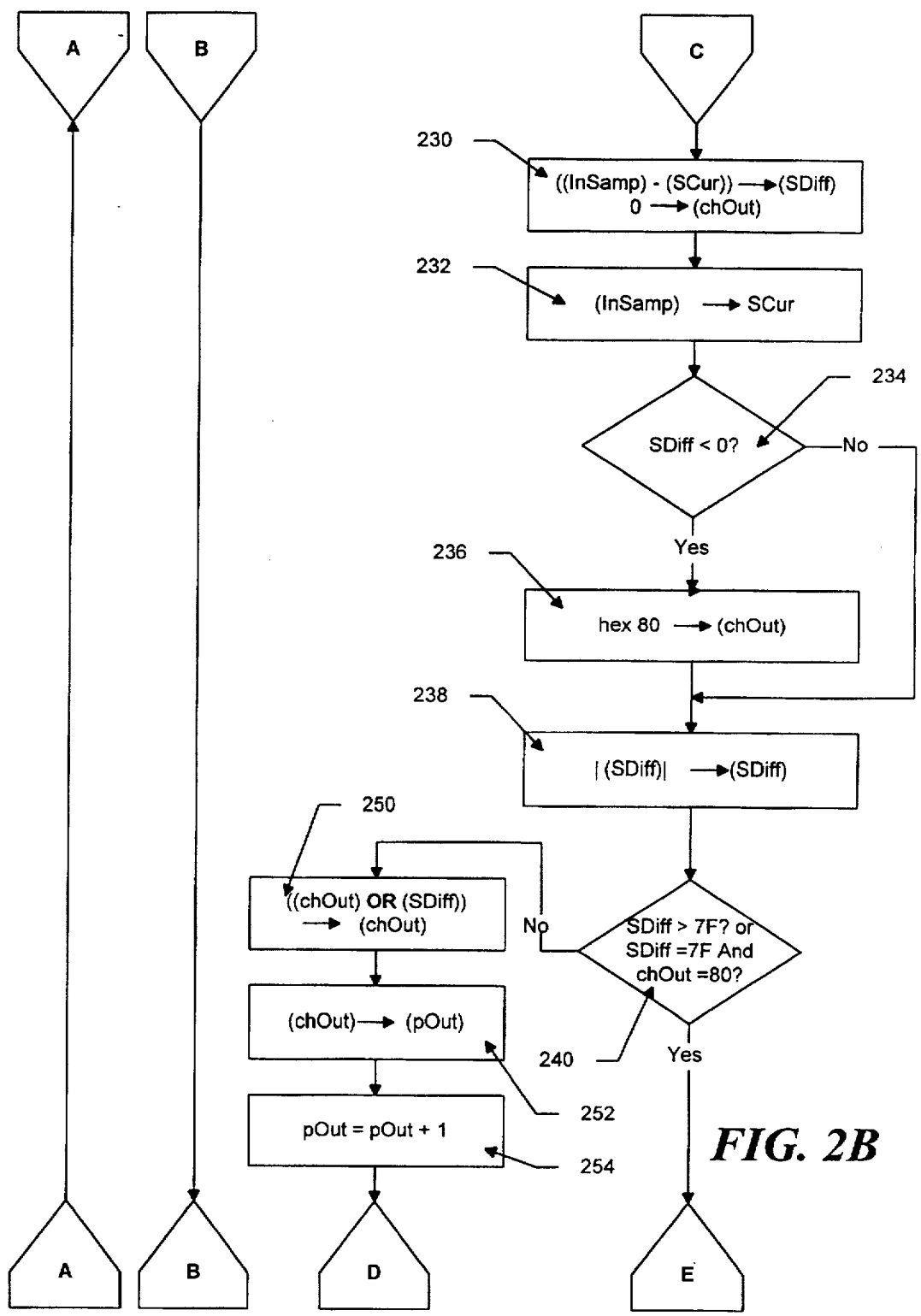
Figure 2C:
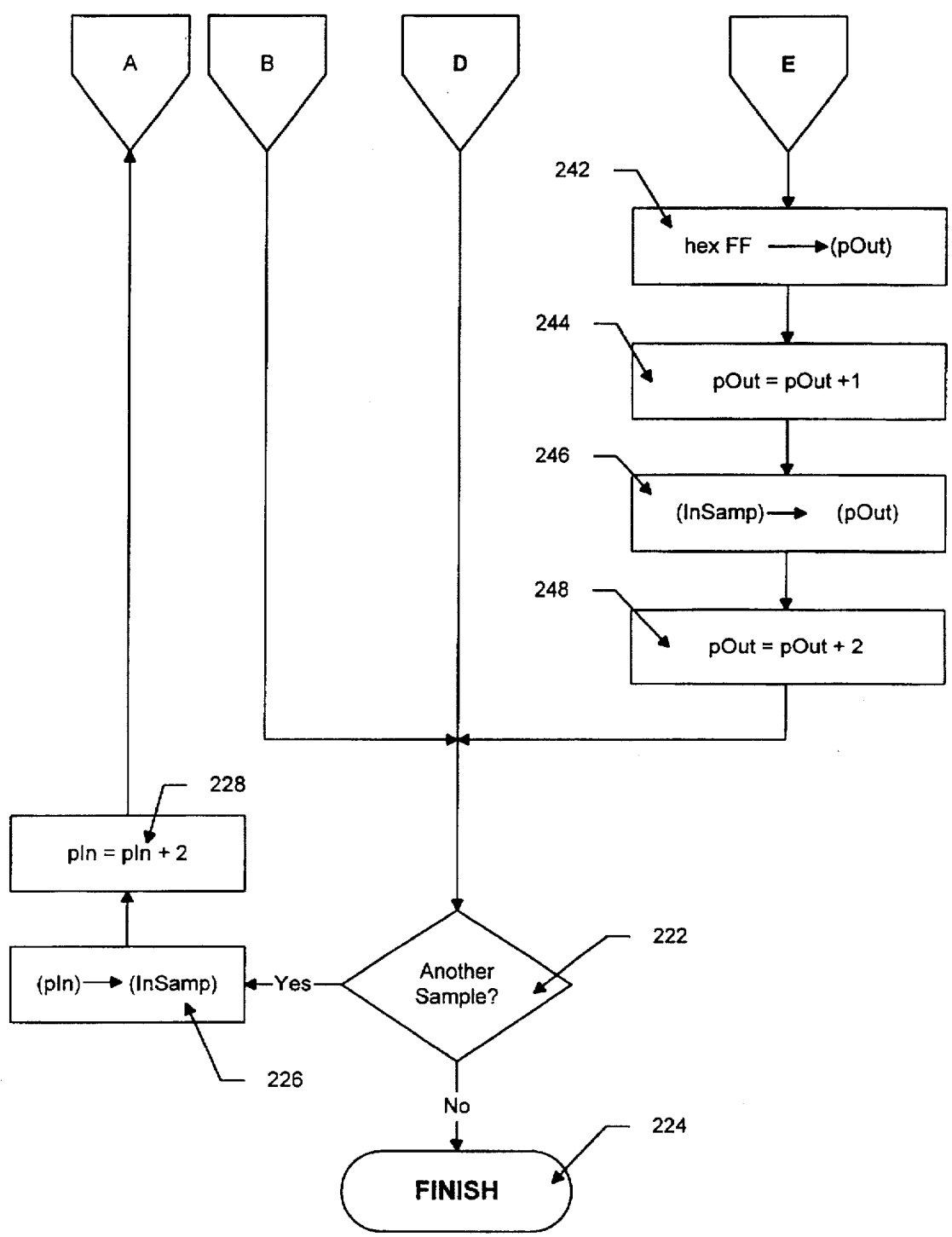

FIGS. 2A–2C form a flowchart illustrating the operation of the inventive PCM audio compression scheme. In this exemplary embodiment it is assumed that the digitized audio samples are stored as eight-bit bytes and that each sample is sixteen bits, or two bytes, wide. The operation begins at step 200 and proceeds to step 210 where an output byte pointer variable, pOut, and an input byte pointer variable, pIn, are initialized. These pointers point to storage locations in a data storage apparatus which holds the digitized audio samples during processing or to a location in a strum buffer used to transport the data. The value of the first input sample is transferred to a holding variable (InSamp) which represents the "next" input sample.

Next, at step 212, the inventive routine determines whether the next input sample (stored in InSamp) is the first input sample of the digitized audio signal. If the next sample is the first sample of the signal, the invention proceeds to step 214 where it copies the value held in the next sample variable in a storage location (SCur) reserved for the "current" sample value. The current sample value will be used, as hereinafter explained, to determine the difference value between the current sample and the next sample.

The inventive method then proceeds to step 216 where the input pointer (pIn) is incremented to indicate the location of the next input sample. As indicated in step 216, the input pointer is incremented by two since each sample comprises two bytes. The routine proceeds to step 218 where the value of the next sample variable is stored in a storage location indicated by the output pointer (pOut) which points to the output data stream. At step 220, the output pointer is incremented, again by two to indicate that two bytes have been transferred to the output data stream.

The routine then proceeds to step 222, where a determination is made whether there is another sample in the digitized audio signal. If there are no more samples, the inventive routine proceeds to step 224 to finish.

Returning to step 222, if there is another digitized audio input sample to be processed, the routine proceeds to step 226, where it retrieves the next input sample by transferring the contents of the storage location identified by the input pointer (pIn) into the next sample holding variable, InSamp. Next the routine proceeds to step 228 where the input pointer is incremented by two so that the input pointer points to the next sample.

The routine then proceeds back to step 212, where it determines whether the value stored in the next sample variable InSamp is the first input sample or not. If the next sample is not the first input sample, the routine proceeds to step 230 where the difference between the "next" sample value contained in variable InSamp and the value of the current sample which is stored in the variable SCur. The value of this difference is stored in a variable, SDiff. At this time, a character output buffer, chOut is cleared (set equal to zero).

The routine then proceeds to step 232 where the current sample value stored in variable, SCur, is updated by transferring the value stored in the next sample variable InSamp. At step 234, the inventive method determines whether the difference between the next sample value and the current sample value is negative. If the difference is negative (indicating that the amplitude decreased) the routine proceeds to step 236 where the high-order bit within the character output buffer, chOut, is set to one (by loading the character buffer with 10000000, hex 80) to indicate a negative difference.

If, on the other hand, in step 234, the computed difference, SDiff, is equal to or greater than zero, the routine proceeds from step 234 directly to step 238, skipping step 236. The high-order bit thus remains at zero (it was cleared to zero in step 230). In step 238, the routine stores the absolute value of the difference SDiff in the location SDiff (the sign of the difference is now indicated by the high-order bit of chOut).

At step 240, the inventive routine determines if either of the conditions (a) the absolute value of the computed difference SDiff is greater than the maximum positive value that can be stored in a single signed byte (01111111, hex 7F) or (b) the absolute value of the difference SDiff is equal to a reserved flag value (01111111, hex 7F with high-order byte of character buffer set; chOut=hex(80)) is true.

If neither condition is true, the difference SDiff between the next input sample and the current input sample can be stored in a single byte, and, in accordance with the principles of the present invention, the difference value is stored in the output data stream in place of the actual sample value. Accordingly, the routine proceeds to step 250 where the character buffer is loaded with the difference value by ORing the difference value SDiff with the contents of the character buffer (which may have the high-order bit set).

At step 252 the contents of the character buffer chOut are transferred to the output data stream location pointed to by output pointer pOut and, at step 254, the routine increments the output pointer pOut by one to indicate that a single byte has been transferred.

Returning to step 240, if the computed magnitude difference between the next and current data sample values was greater than the maximum value (hex 7F) or was equal to hex 7F with chOut equal to hex 80, the difference between the next sample and the current sample cannot be stored in a single byte and, in accordance with the principles of the present invention, the actual value of the next sample will be stored in the output data stream.

Accordingly, the routine proceeds to step 242 where a flag value (hex FF) is written into the output data stream location indicated by the output pointer, pOut. The flag value, hex FF, indicates that the next two values in the data stream hold an uncompressed PCM audio sample value. At step 244, the routine increments the output pointer pOut by one to account for the flag value, then proceeds to step 246 where the two bytes of the next sample value within the variable InSamp is transferred to the output data stream to a location pointed to by the output pointer, pOut. The routine then proceeds to step 248, where the output pointer pOut is incremented by two to indicate that two bytes have been transferred.

Next, the routine proceeds to step 222 where it determines whether there is another input sample to be processed. The routine then proceeds, as previously described, either to step 226 to process more samples or to finish at step 224.

Figure 3A:
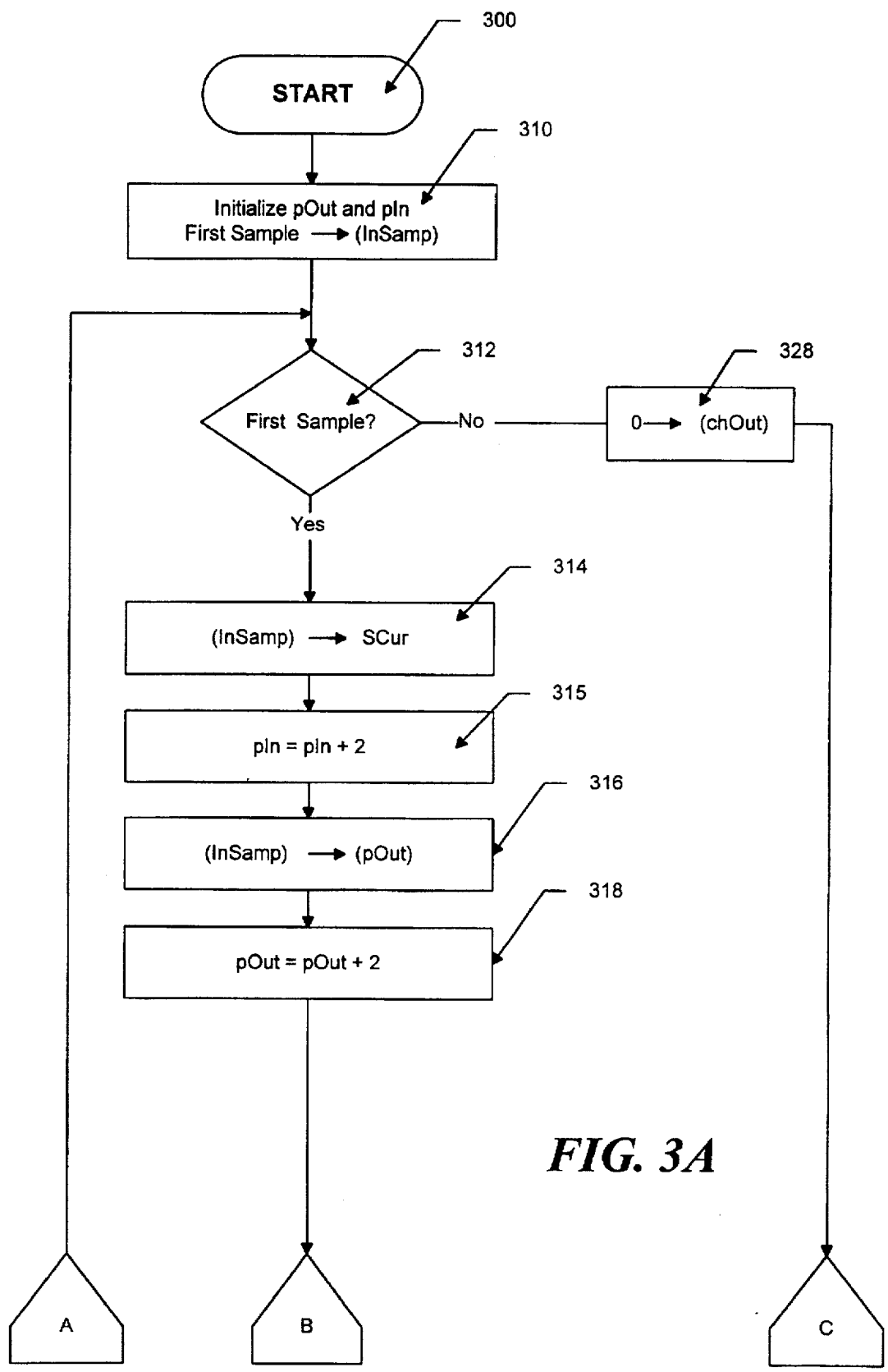
FIGS. 3A–3C, when placed together, form a flow diagram which illustrates the inventive method of decompressing audio data that has been compressed using the method illustrated in FIGS. 2A–2C.
Figure 3B:
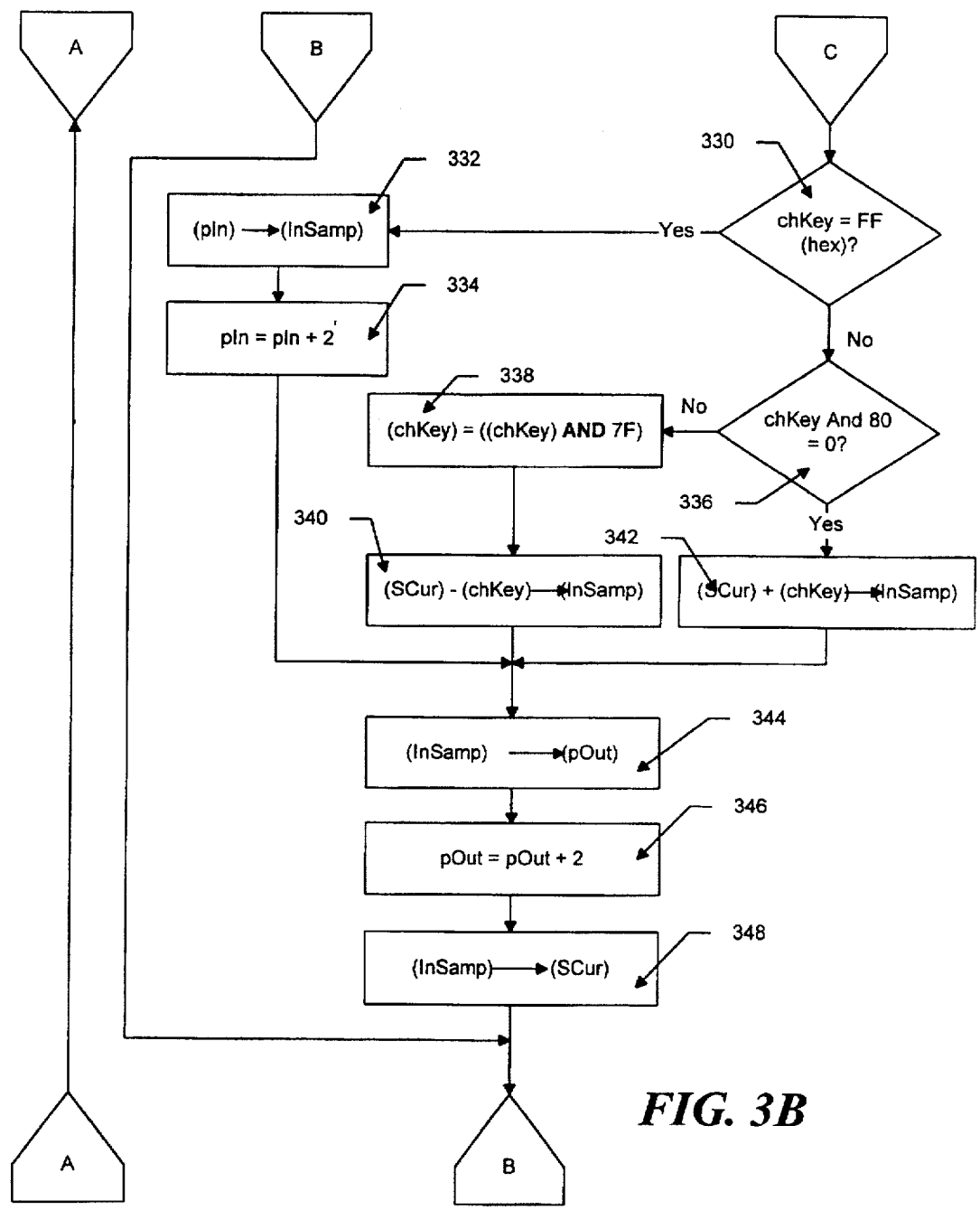
Figure 3C:
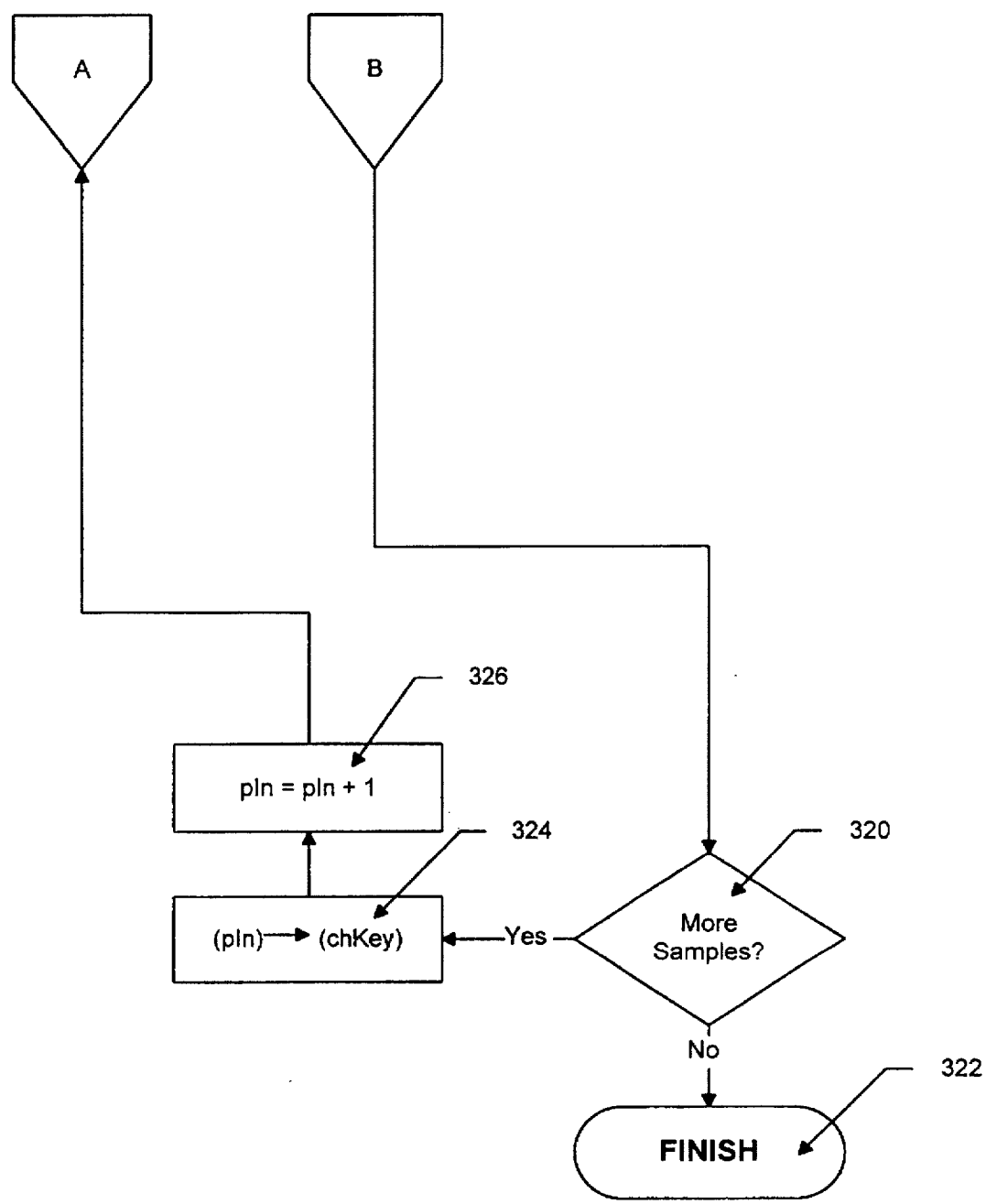

FIGS. 3A–3C form a flowchart detailing the steps in an illustrative decompression routine. More particularly, the inventive routine begins the decompression process at step 300 then proceeds to step 310 where it initializes the output pointer, pOut, the input pointer, pIn and transfers the first sample of the compressed data to the next sample variable, InSamp. At step 312, a check is made to determine whether the next sample is the first sample of the compressed data. If it is the first sample, the routine proceeds to step 314 where it copies the value contained within the variable InSamp to the current sample variable SCur. At step 315, the input pointer, pIn, is incremented by two to account for the two bytes of the first sample At step 316, the routine transfers the value contained within the location "InSamp" into the output stream location pointed to by the output pointer, pOut. At step 318, the output pointer, pOut, is incremented by two to indicate that two bytes have been output. Then, at step 320, the routine determines whether there are more input samples. If there are no more input samples, the routine proceeds to finish in step 322.

If there are more input samples, the invention proceeds to step 324 where the next compressed sample byte stored in the location indicated by the input pointer, pIn, is read into an input buffer "chKey" so that the byte can be examined to determine if it is a flag value. At step 326, the input pointer, pIn, is incremented by one to account for the byte just read.

At step 312, the routine, upon determining that this is not the first sample, proceeds to step 328, where it clears the output character buffer "chOut" and proceeds to step 330. At step 330, the routine determines whether the contents of the input buffer "chKey" are equal to the flag value FF (hex). If the contents of chKey equal FF (hex), the next two bytes in the input data stream comprise an uncompressed PCM sample. Consequently, at step 332, the next input sample value from the input stream pointed to by the pointer, pIn, is transferred in the next sample variable, InSamp and the input pointer, pIn is incremented, at step 334, by two to account for the sample.

Returning to step 330, if the value within the input buffer, chKey, is not a flag value, then it is a difference value and the routine proceeds to step 336. In step 336 the high-order bit of the difference value is checked by ANDing contents of the input buffer, chKey and 10000000 (80 hex) and determining whether the resultant is equal to zero. As previously described, the high-order bit determines whether the compressed sample should be added to or subtracted from the previous sample value.

If the resultant of the AND operation is non-zero, indicating that the high-order bit is set and the difference is negative and should be subtracted from the current sample value in SCur, the routine proceeds to step 338 where the high-order bit within "chKey" is cleared (set to zero) by ANDing the contents of chKey and 01111111 (7F, hex). At step 340, the difference value in chKey is subtracted from the current input value in SCur. The resultant is transferred to the next sample variable, InSamp.

If the resultant was equal to zero at step 336, the high-order bit was clear indicating that the difference value is positive and should be added to the current value. Accordingly, in step 342, the current sample value in SCur is added to the difference value in chKey and the sum transferred to the next sample variable InSamp.

After either of steps 340, 342 or 334, the illustrative routine proceeds to step 344 where it copies the next sample value in variable InSamp to the location indicated by the output pointer pOut, thereby placing the decompressed sample in the output data stream. At step 346 the output pointer, pOut, is incremented by two bytes and at step 348, the value within the variable InSamp is copied into the current sample variable SCur in preparation for processing the next sample.

Following step 348, the routine proceeds to step 320 where, as previously described, a determination is made whether there are more samples. Based on that decision, the additional samples are processed or the routine finishes if all samples have been processed.

As is clear from the forgoing description, although fewer digits are required to represent the signal in compressed form, the inventive compression and decompression processes store and retrieve all the information contained within the original digitized signal. No information is discarded; this is a lossless compression/decompression process.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A computer program product comprising:
a computer useable medium having computer program code means embodied in said medium for compressing a stream of coded data samples, the computer useable medium further comprising:
computer program code means for comparing a first data sample value and a second consecutive data sample value in the stream and for forming a difference value between the first data sample value and the second data sample value;
computer program code means responsive to the difference value and the second data sample value for forming a compressed data stream by inserting the difference value into the compressed data stream in place of the second data sample value when the difference value occupies less storage space than the second data sample value; and
computer program code means responsive to the compressed data stream forming code means for inserting a predetermined flag value into the compressed data stream when the difference value occupies at least the same storage space as the second data sample value.

2. The computer program product of claim 1 wherein each data sample value comprises a first number of data bytes and wherein the computer program code means for comparing further comprises code means for forming a digital difference value between the first data sample value and the second data sample value, the digital difference value comprising a second number of data bytes.

3. The computer program product of claim 2 wherein the computer program code means for forming the compressed data stream further comprises computer code means for inserting the difference value into the compressed data stream in place of the second data sample value when the second number of bytes is less than the first number of bytes.

4. The computer program product of claim 1 wherein the difference value includes a sign value indicating whether the difference value is positive or negative.

5. A computer program product on computer readable medium for compressing a stream of coded digital data samples each having a respective number of data bytes, the product comprising:
means responsive to a first data sample value and to a consecutive second data sample value for computing a signed difference value between the first sample value and a second sample value, the difference value having a second number of bytes; and
output means for generating a compressed data byte stream, the output means inserting the difference value into the compressed data byte stream when the second number of bytes is less than the number of bytes of the second sample value and for inserting an indicator and the second data sample value into the compressed data stream when the second number of bytes is equal to or greater than the number of bytes of the second sample, the indicator indicating that the second sample value is in uncompressed form.

6. The product as recited in claim 5 further comprising means for inserting a predetermined flag value into the compressed data stream prior to inserting the second data sample value into the compressed data stream when the second number or bytes is equal to or greater than the first number of bytes wherein the predetermined flag is the indicator.

7. The product as recited in claim 5 comprising a storage means for temporarily storing each data sample in the stream of coded digital data samples.

8. The product as recited in claim 7 wherein the computing means is responsive to the value of a data sample stored in the storage means and to the value consecutive second data sample for computing the signed difference value.

9. A computer program product on a computer readable medium for compressing a stream of coded digital data samples, comprising:
means for forming a difference value between a first data sample and a second data sample;
means for comparing the difference value to the second data sample; and
means for forming a compressed data stream by inserting the difference value into the compressed data stream in place of the second data sample when the difference value occupies less storage space than the second data sample and inserting the second data sample and an indicator indicating that the second data sample is in uncompressed form when the difference value occupies the same or more storage space than the second data sample.

10. The product as recited in claim 9 further comprising means for inserting a predetermined flag value into the compressed data stream when the difference value occupies the same or more storage space than the second data sample wherein the flag value is the indicator.

11. The product as recited in claim 9 wherein each data sample is comprised of a respective number of data bytes and wherein the difference forming means comprises means for forming a digital difference value between the first data sample value and the second data sample value, the digital difference value comprising a second number of data bytes.

12. The product as recited in claim 11 wherein the compressed data stream forming means comprises means for inserting the difference value into the compressed data stream in place of the second data sample when the second number of bytes is less than the first number of bytes.

13. The product as recited in claim 9 wherein the difference forming means for forming a difference value including a sign value which indicates whether the difference value is positive or negative.

* * * * *